(12) United States Patent
Taniguchi et al.

(10) Patent No.: US 7,275,899 B2
(45) Date of Patent: Oct. 2, 2007

(54) MACHINING APPARATUS WITH COOLANT-OPERATED CLAMP DEVICE

(75) Inventors: Takao Taniguchi, Anjo (JP); Shigeharu Ikeda, Anjo (JP); Minoru Hidaka, Anjo (JP); Tomoyoshi Sato, Anjo (JP); Hiroshi Osada, Anjo (JP); Takao Kobayashi, Anjo (JP); Hironao Kinpara, Anjo (JP); Shigeto Noma, Anjo (JP); Kazutaka Murai, Anjo (JP); Masato Sakakibara, Anjo (JP)

(73) Assignee: Aisin AW Co., Ltd. (JP)

( * ) Notice: Subject to any disclaimer, the term of this patent is extended or adjusted under 35 U.S.C. 154(b) by 557 days.

(21) Appl. No.: 10/909,296

(22) Filed: Aug. 3, 2004

(65) Prior Publication Data
US 2005/0036845 A1 Feb. 17, 2005

(30) Foreign Application Priority Data
Aug. 13, 2003 (JP) ............................. 2003-207466

(51) Int. Cl.
*B23Q 7/00* (2006.01)
(52) U.S. Cl. ...................... 409/136; 29/33 P; 409/225; 409/197; 408/56; 408/103; 269/25; 269/30; 198/346.1; 198/867.02
(58) Field of Classification Search ................ 408/56, 408/57, 59, 103; 409/135–136, 219, 225, 409/197, 903; 269/20, 23, 25–26, 30; 198/867.02, 198/867.05, 803.3, 346.1; 29/33 P
See application file for complete search history.

(56) References Cited

U.S. PATENT DOCUMENTS 3,420,148 A * 1/1969 Doerfer et al. ............... 92/107
4,555,047 A * 11/1985 Ackley ....................... 222/192
4,669,161 A * 6/1987 Sekelsky, Jr. ............... 29/33 P
4,778,312 A * 10/1988 Boberg et al. .............. 408/1 R
4,850,099 A * 7/1989 Scollard ...................... 29/563
4,976,025 A * 12/1990 Aldridge et al. ............. 29/563
5,067,694 A * 11/1991 Rypka ......................... 269/20
5,628,104 A * 5/1997 Rutschle et al. ............ 29/563
2006/0157905 A1* 7/2006 Lenzini ....................... 269/21

FOREIGN PATENT DOCUMENTS

| FR | 2555484 A | * | 5/1985 |
| JP | 54116797 A | * | 9/1979 |
| JP | 11-156654 | | 6/1999 |
| JP | 2001-025939 | | 1/2001 |
| JP | 2001-287135 | | 10/2001 |
| JP | 2002-187037 | | 7/2002 |
| JP | 2002-283168 | | 10/2002 |

* cited by examiner

*Primary Examiner*—Daniel W. Howell
(74) *Attorney, Agent, or Firm*—Bacon & Thomas, PLLC

(57) ABSTRACT

Machining coolant/lubricant is used to operate a piston of a clamping-side coupler by feeding same via a coolant feed passage to a clamping pressure chamber through a first check valve and a clamping pressure fluid passage. The same coolant/lubricant is discharged from an unclamping pressure chamber through an unclamping pressure fluid passage and a second check valve. The resulting movement of the piston downwards brings a clamp member into contact with a workpiece to thereby clamp the workpiece on a table. Thus, a dedicated pressure source for clamping can be dispensed with.

6 Claims, 7 Drawing Sheets

SPINDLE TOOL

VERTICAL MACHINING

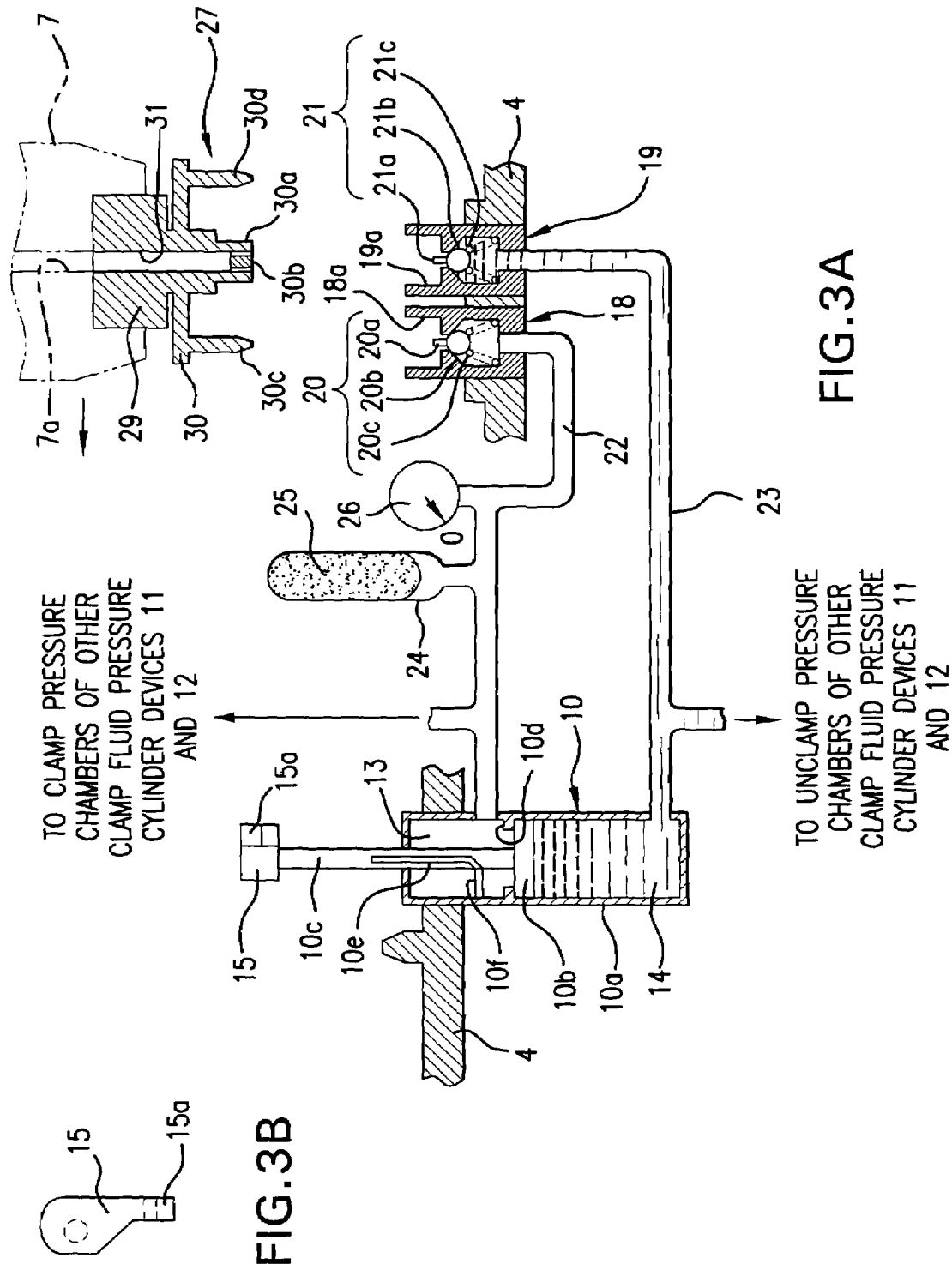

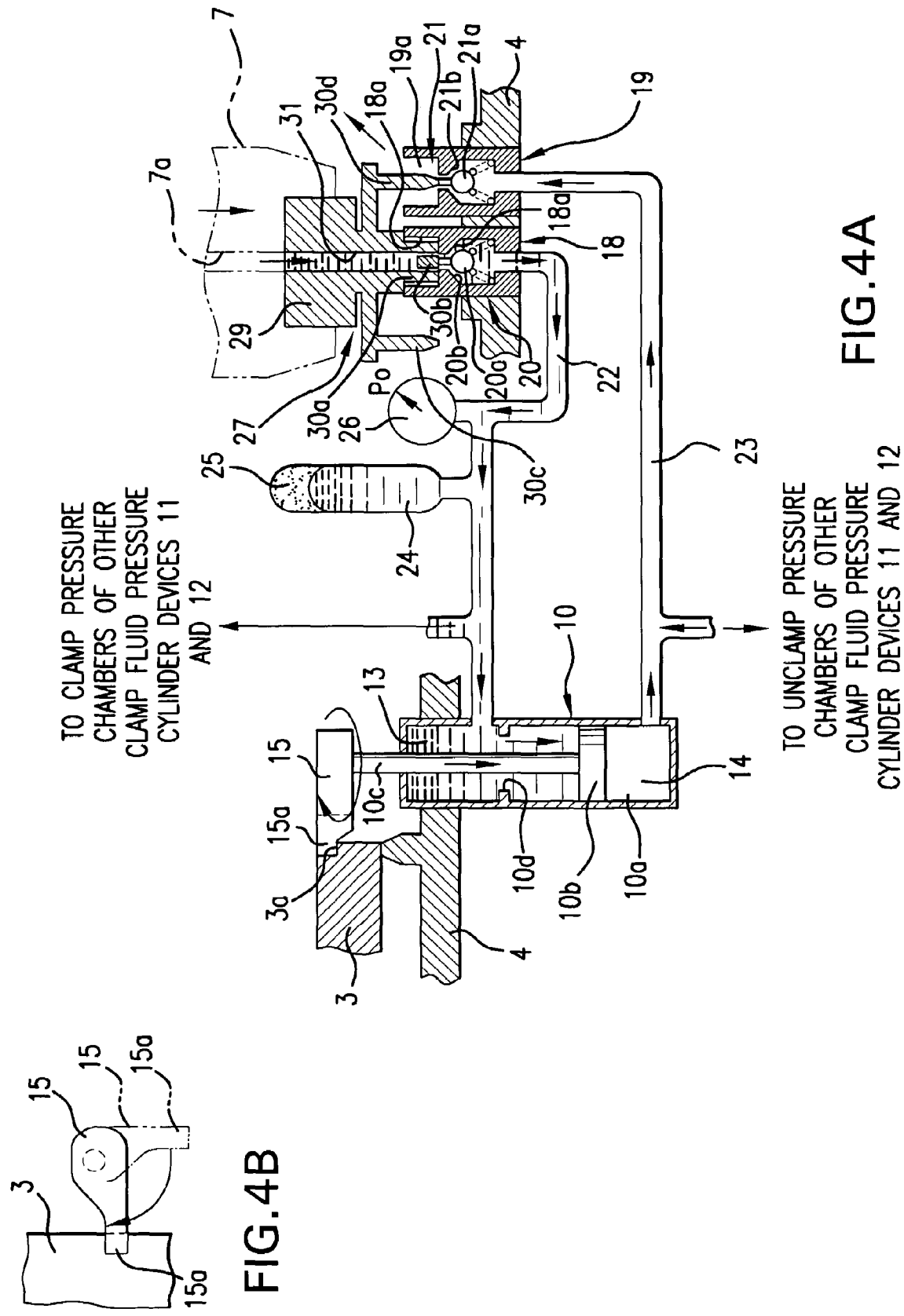

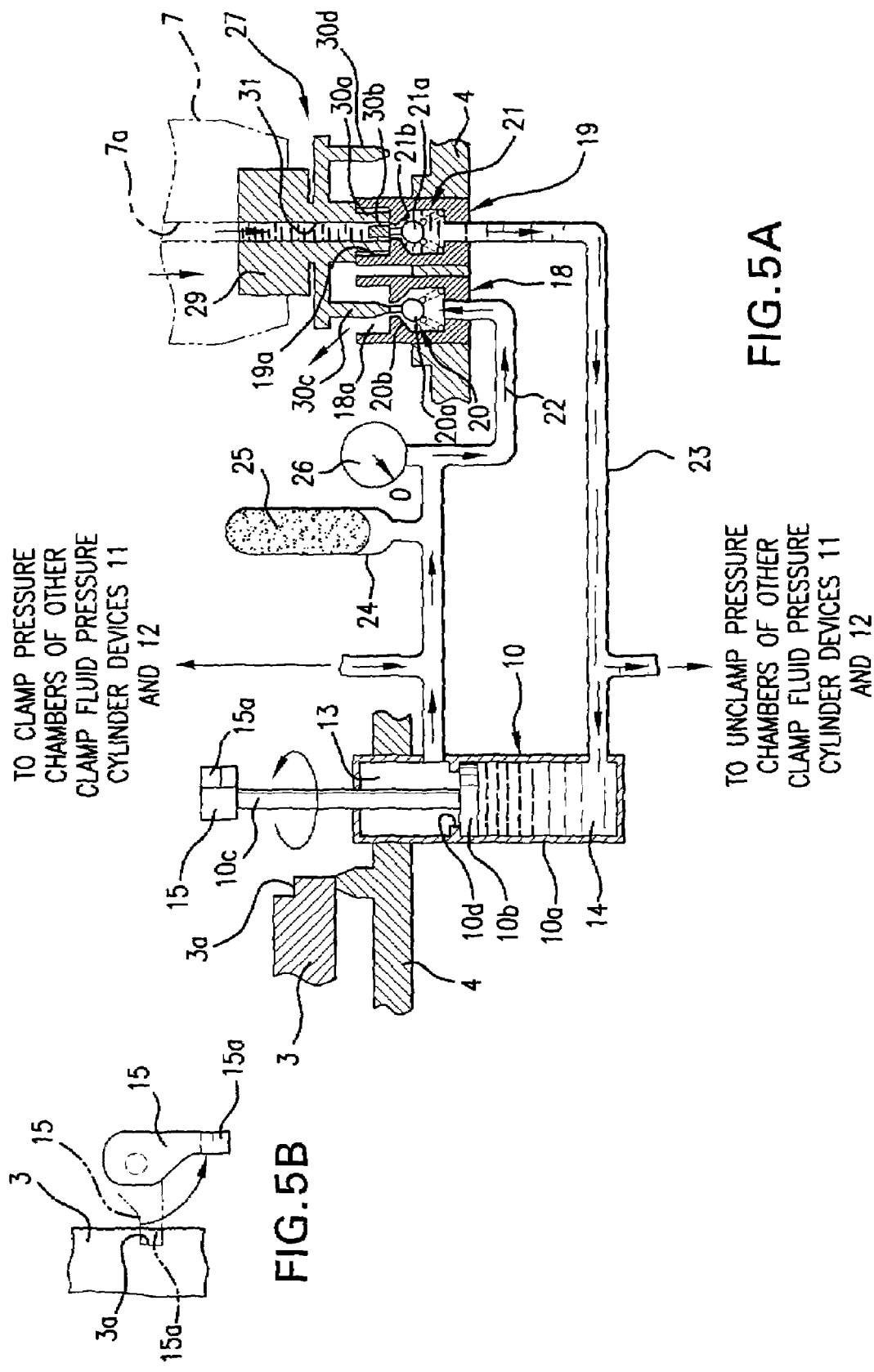

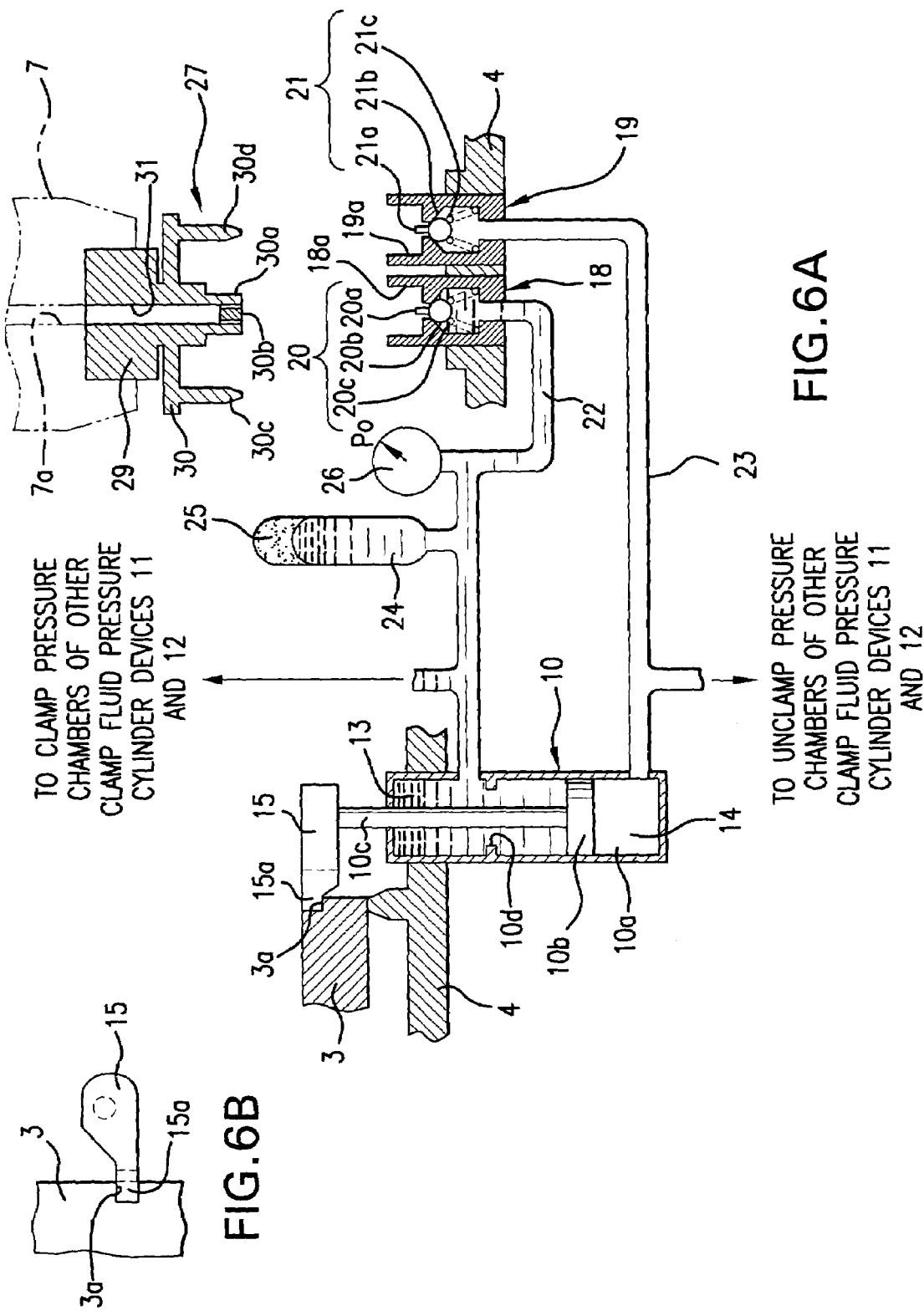

MACHINING APPARATUS WITH COOLANT-OPERATED CLAMP DEVICE

INCORPORATION BY REFERENCE

The disclosure of Japanese Patent Application No. 2003-207466 filed on Aug. 13, 2003 including the specification, drawings and abstract is incorporated herein by reference in its entirety.

CROSS-REFERENCE TO RELATED APPLICATION

This application claims priority under 35 USC 119 of Japanese Patent Application No. 2003-207466, filed Aug. 13, 2003.

BACKGROUND OF THE INVENTION

1. Field of Invention

The present invention relates to the technical field of machining apparatus such as a machining center for machining a workpiece by means of a machining tool held by a holder removably fitted to a spindle. In particular, the invention relates to the technical field of machining apparatus that applies coolant to the machining tool and to the machined portion of a workpiece, with feed of the coolant during machining through coolant feed passages formed in the spindle, to the machining tool holder, and to the machining tool.

2. Description of Related Art

Conventionally, components of automatic transmissions (hereinafter also referred to as an "A/T") are machined in various manners using a machining apparatus such as a machining center. In suc a machining the workpiece needs to be fixed on a table. For this purpose, the machining apparatus is provided with a clamping device for the workpiece.

The related art discloses a clamping device that clamps and unclamps a workpiece, actuated by means of an air cylinder (e.g., Japanese Patent Application Laid-Open No. HEI 11-156654 and Japanese Patent Application Laid-Open No. 2002-283168). The related art also discloses a clamping device that clamps and unclamps a workpiece, actuated by means of a hydraulic cylinder (e.g., Japanese Patent Application Laid-Open No. 2002-283168). In another machining apparatus of the related art a workpiece is clamped by actuating a clamp member by means of a gas sealed in a cylinder and that unclamps the workpiece by supplying the cylinder with a hydraulic pressure (e.g., Japanese Patent Application Laid-Open No. 2002-187037).

The related art also proposes to use a coolant as a machining liquid, a lubricant or a cooling agent during the machining of a workpiece by supplying the coolant at a predetermined pressure to a machined portion of the workpiece and that portion in contact with a machining tool, such as a drill held by a machining tool holder fitted to a spindle, via coolant supply passages formed in the spindle, the machining tool holder and the machining tool, and to return the used coolant to a coolant reservoir (e.g., Japanese Patent Application Laid-Open No. 2001-25939 or Japanese Patent Application Laid-Open No. 2001-287135).

The clamping devices disclosed in Japanese Patent Application Laid-Open No. HEI 11-156654, 2002-283168 and 2002-187037 use air pressure or hydraulic pressure to clamp and unclamp the workpiece and thus requires a pressure source. However, a dedicated pressure source for air pressure or hydraulic pressure creates problems such as complication of the apparatus, overall increase in the size of the machining apparatus, and increased cost. Moreover, a control system is required for clamping in addition to the control system for the machining. This complicates the overall control and further increases cost. In the clamp device disclosed in Japanese Patent Application Laid-Open No. 2002-187037, furthermore, since clamping force is obtained from pressure of a gas sealed in a cylinder, the clamping force changes with changes in gas pressure over time, differences in thickness of workpieces, and the like, resulting in additional problems. Thus, it is difficult to always clamp the workpieces with a constant clamping force.

On the other hand, in the machining apparatus disclosed in Japanese Patent Application Laid-Open Nos. 2001-25939 and 2001-287135, the coolant is used as a machining liquid, a lubricant or a cooling agent simply by supply at the predetermined pressure, to the machined portion of the workpiece where abutted by the machining tool during the machining of the workpiece.

SUMMARY OF THE INVENTION

Accordingly, an object of the invention is to provide a clamping device for a machining apparatus which does not require a dedicated pressure source, which allows the entire machining apparatus to be made more compact, which further simplifies overall control, and which can be manufactured at a low cost.

The clamping device for a machining apparatus according to the present invention is operated by supply of coolant to a fluid pressure cylinder device. Since coolant is used as a power source for clamping the workpiece, there is no need to provide a dedicated pressure source for clamping. As a result, the machining apparatus can be made more compact as a whole and can be manufactured at a lower cost.

The present invention further provides control of fitting/removing a clamping tool to/from a spindle and control of supply of the coolant. These controls can be performed by the same control system used to control the machining apparatus of the related art (i.e., a control for switching machining tools for a spindle with another one and a control for supplying a coolant during machining). Therefore, the overall control can further be simplified, which results in a corresponding reduction in cost. In this case, the portion of the clamp operating tool that is removably engaged with and held by the spindle is made structurally identical with a corresponding portion of a machining tool coupler (holder) of the related art, whereby substituting a clamp operating tool for another in the spindle can be performed in substantially the same manner as that of replacing one machining tool with another in the related art. This makes it possible to quickly replace one clamp operating tool with another, and to quickly clamp or unclamp.

Further, since coolant is supplied every time the clamping operation is performed, a substantially constant clamping force can be obtained, and the workpiece can be stably clamped with the same clamping force for a long time, regardless of the thickness thereof. In particular, use of a pressure holding unit makes it possible to hold constant the clamping pressure in a clamping pressure chamber of a clamp fluid pressure cylinder device during the machining of a workpiece, and to reliably clamp the workpiece with a substantially constant clamping force. Thus, the workpiece can be machined with higher precision.

BRIEF DESCRIPTION OF THE DRAWINGS

FIG. 1A is a perspective view of the machining apparatus. FIG. 1B is a partially enlarged perspective view of the spindle of the machining apparatus of FIG. 1A and the clamping device for the workpiece.

FIG. 3A schematically shows the clamping device for the workpiece shown in FIGS. 1A and 1B in an unclamped state; and FIG. 3B is a plan view of the clamping member.

FIG. 4A is a schematic view illustrating engagement of a workpiece by the clamping device shown in FIG. 3; and FIG. 4B is a plan view of the clamping member.

FIG. 5A is a schematic view illustrating release of the workpiece from the clamping device; and FIG. 5B is a plan view of the clamping member.

FIG. 6A is a schematic view of the clamping device for the workpiece shown in FIGS. 1A and 1B in a clamped state; and FIG. 6B is a plan view of the clamping member.

DETAILED DESCRIPTION OF PREFERRED EMBODIMENT

Hereinafter, an embodiment of the invention will be described with reference to the drawings.

Figure 1B:
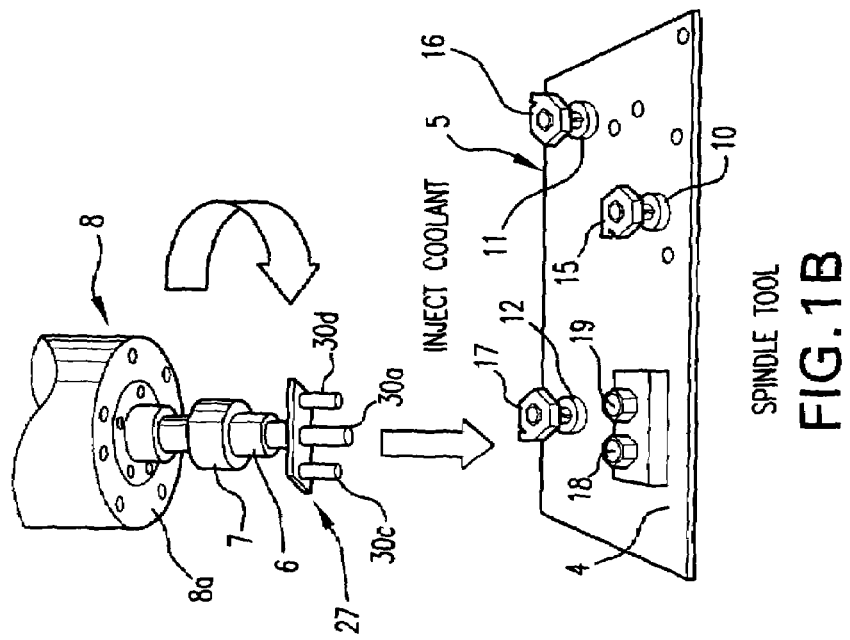
FIGS. 1A and 1B are schematic views showing an embodiment of a clamping device of the invention in a machining apparatus of the invention.
Figure 1A:
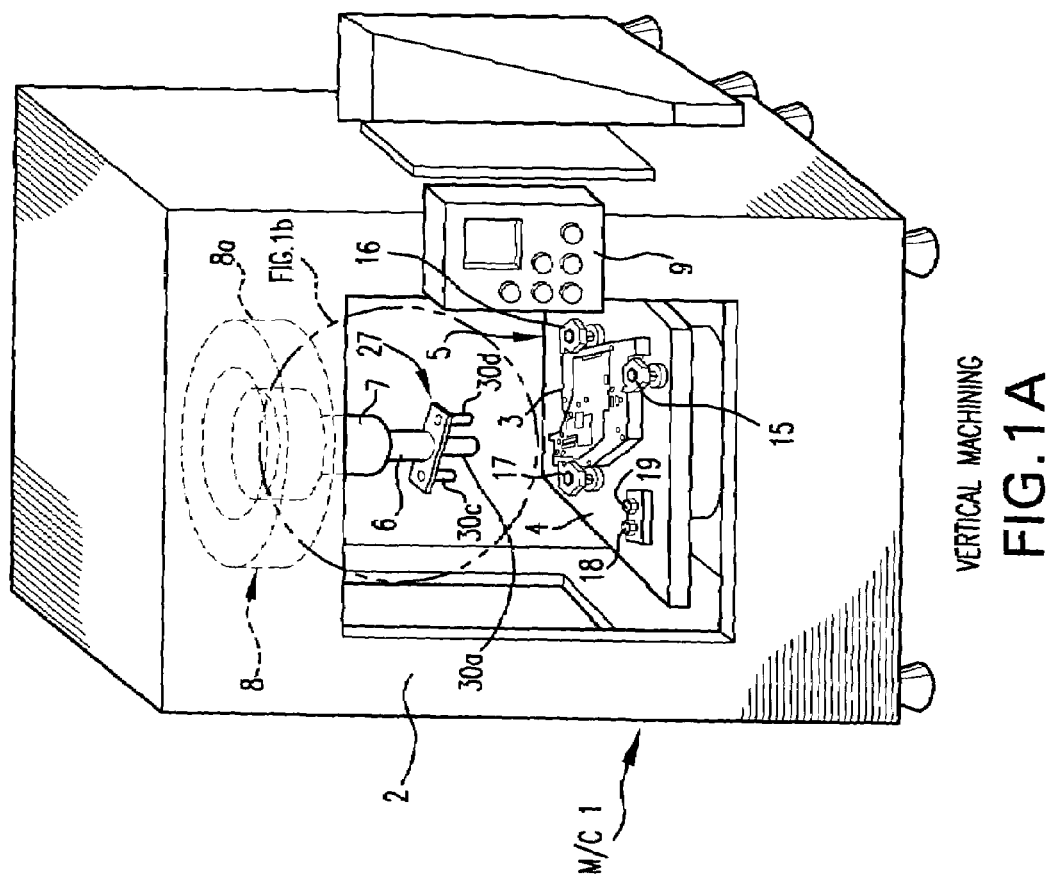

In a first embodiment shown in FIGS. 1A and 1B, the machining apparatus is an M/C 1 for vertical machining. The M/C 1 is provided with an apparatus body 2, a table 4 for fixedly supporting a workpiece 3, a clamping device 5 for fixing the workpiece 3 on the table 4, tool holders 6, a spindle 7, a tool storage unit 8 for storing the tool holders 6, and an operation panel 9 for the M/C 1. Various tools are removably fitted on or in respective tool holders 6. These tool holders 6 are removably mounted in the spindle 7, which transmits rotation to the tool held by a tool holder 6 and performs the operation corresponding to the function of the mounted tool.

When not in use, the tool holders 6 with tools attached are stored in the tool storage unit 8. For use, one of the tool holders 6 is removed from the tool storage unit 8 and fitted to the spindle 7 by means of an automatic tool changer (not shown). After the machining by one of the tools has been finished, the tool holder 6 to which that one tool is fitted is removed from the spindle 7 and stored in the tool storage unit 8 by means of the automatic tool changer. Because the automatic tool changer and the tool storage unit 8 may be conventional, they will not be described in detail here.

Figure 2B:
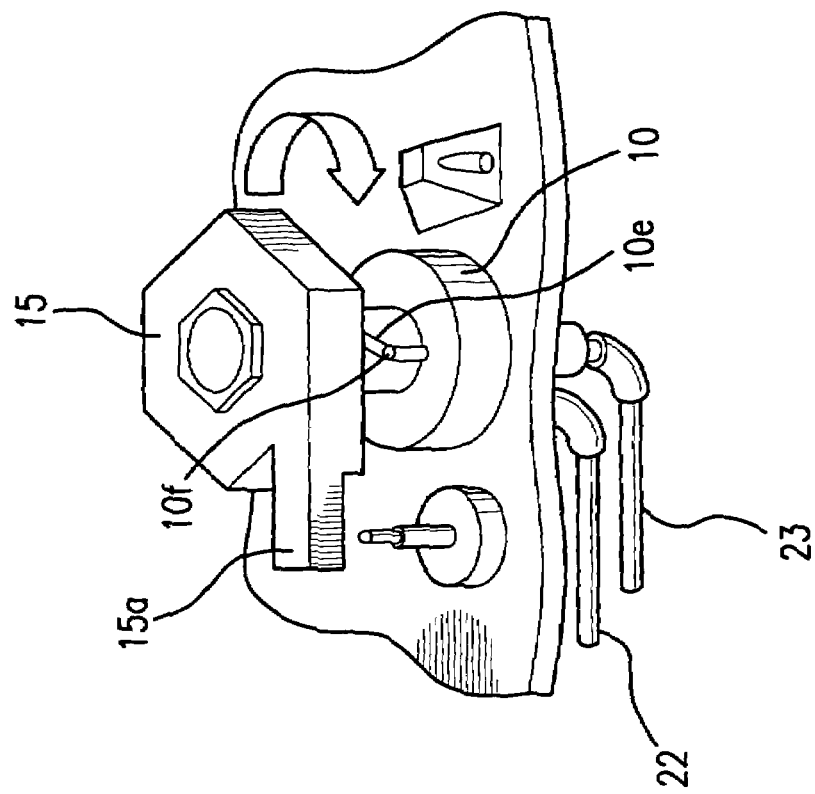
FIG. 2B is a perspective view of one of the fluid pressure cylinders shown in FIG. 2A and one of the clamp members shown in FIG. 2A.
Figure 2A:
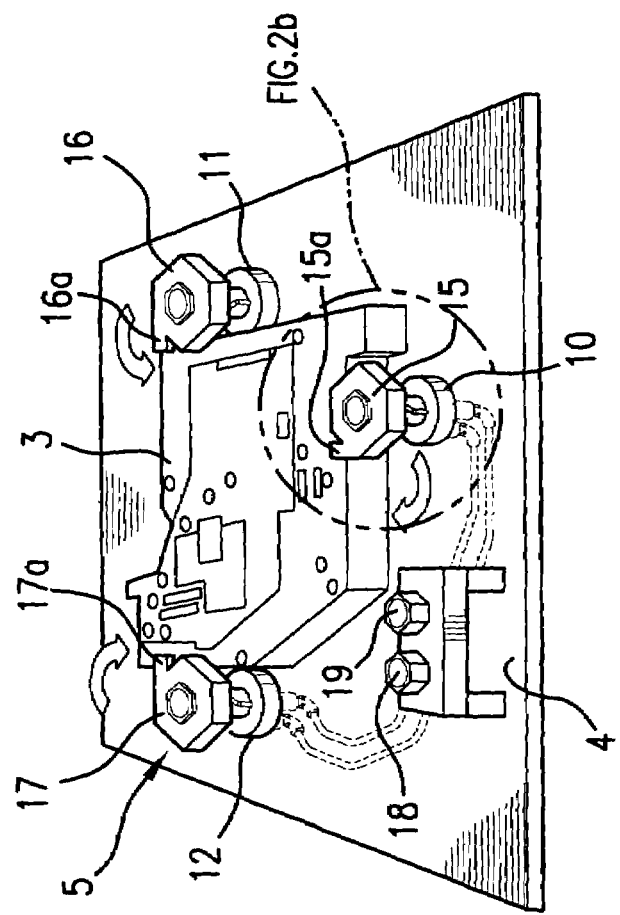
FIG. 2A is a perspective view of the clamping device for the workpiece shown in FIGS. 1A and 1B.

The table 4 is removably fixed to the apparatus body 2. As shown in FIGS. 1B and 2A, the clamping device 5 is installed on the table 4. The clamping device 5 is provided with a predetermined number (three in the illustrated example) of fluid pressure cylinder devices 10, 11 and 12. Because the fluid pressure cylinder devices 10, 11 and 12 are all identical in construction, only the fluid pressure cylinder device 10 will be described here as representative of all.

As shown in FIG. 3A, the fluid pressure cylinder device 10 is a double-acting cylinder device that includes a cylinder 10*a*, a piston 10*b* which reciprocably slides in the cylinder 10*a*, and a piston rod 10*c*. The piston rod 10*c* extends from the piston 10*b*, fluid-tightly and slidably penetrates the cylinder 10*a*, and protrudes outside the cylinder 10*a*. The cylinder 10*a* is fixed to the table 4, and a large portion of the cylinder 10*a* is disposed below the table 4. Part of a protruding portion of the piston rod 10*c* is disposed on the side of the table 4 where the workpiece 3 is fixed. Referring to FIG. 3A, the piston 10*b* divides the interior of the cylinder 10*a* into an upper chamber 13 and a lower chamber 14. A stopper 10*d* for limiting travel of the piston 10*b* protrudes from the inner surface of the cylinder 10*a*.

A clamping member 15 is fixed to an end of the piston rod 10*c* on the other side of the piston 10*b*. The clamping member 15 has a clamp 15*a* which abuts on and clamps the workpiece 3. As shown in FIGS. 2B and 3A, a cam groove 10*e* is formed in the piston rod 10*c*. A protrusion 10*f* protrudes from the inner surface of the cylinder 10*a* and has a leading end engaged within the cam groove 10*e*.

Due to the engagement of the protrusion 10*f* within the cam groove 10*e*, the piston rod 10*c* and the clamping member 15 turn as the piston rod 10*c* moves. In this case, the clamp member 15 turns by 90° between an unclamped position wherein the workpiece 3 is not held and a clamping position wherein the workpiece 3 is clamped. The unclamped position is indicated by a solid line in FIG. 3A and by a line of alternate long and two short dashes in FIG. 4B. The clamped position is indicated by a solid line in both FIG. 4A and FIG. 4B. The turning angle between the unclamped position and the clamping position is not necessarily 90° and can be set at will.

Likewise, as shown in FIGS. 1B and 2A, clamping members 16 and 17 are fixed to piston rods of the other fluid pressure cylinder devices 11 and 12, respectively. Both the clamping members 16 and 17 also have clamp portions 16*a* and 17*a* which abut on and clamp the workpiece 3. Each of the fluid pressure cylinder devices 11 and 12 is provided with a cam groove and a protrusion, which are substantially identical to, respectively, the cam groove 10*e* and the protrusion 10*f* previously described. In this case, as indicated by arrows in FIG. 2A, the cam grooves of the fluid pressure cylinder devices 10 and 12 are formed such that the clamp members 15 and 17 turn clockwise as the piston rods move, and the cam groove of the fluid pressure cylinder device 11 is formed such that the clamp member 16 turns counterclockwise, namely, in the direction opposite that of the turning of the clamp members 15 and 17 as the piston rod moves. As a matter of course, these cam grooves need not be thus constructed but can be designed in any manner that allows the clamp members to turn in the respective desired directions.

In the following description, for convenience of explanation, the cylinder, piston, piston rod, stopper, cam groove, clamping pressure chamber, and release chamber of each of the fluid pressure cylinder devices 11 and 12 will be respectively designated 10*a*, 10*b*, 10*c*, 10*d*, 10*e*, 13 and 14, as with the fluid pressure cylinder device 10.

As shown in FIG. 3A, a clamping-side coupler 18 and an unclamping-side coupler 19 are fixed to the table 4. The clamping-side coupler 18 and the unclamping-side coupler 19 are identical in construction and are provided with check valves 20 and 21 respectively. The check valves 20 and 21 are composed of valve bodies 20*a* and 21*a*, valve seats 20*b* and 21*b*, and springs 20*c* and 21*c*, respectively. The valve bodies 20*a* and 21*a* are moveable onto and away from their respective valve seats 20b and 21b. The springs 20c and 21c bias the valve bodies 20a and 21a toward their respective valve seats 20b and 21b. Further, guide ports 18a and 19a are formed in the clamping-side coupler 18 and the unclamping-side coupler 19, respectively.

The clamping-side coupler 18 is connected to the clamping pressure chamber 13 of the cylinder 10a of each of the fluid pressure cylinder devices 10, 11 and 12 via a pressure fluid passage 22. The unclamping-side coupler 19 is connected to the unclamping pressure chamber 14 of the cylinder 10a of each of the fluid pressure cylinder devices 10, 11 and 12 via an unclamping pressure fluid passage 23. Both the clamping pressure fluid passage 22 and the unclamping pressure fluid passage 23 may be flexible or inflexible pipes.

The clamping pressure fluid passage 22 is provided with an accumulator 24 ("pressure holding unit"). A gas 25 such as nitrogen or the like is sealed in the accumulator 24. The gas 25 expands or contracts in accordance with the pressure in the clamping pressure fluid passage 22 (pressure in the clamping pressure chamber 13). Even if a slight pressure leak from the clamp pressure fluid passage 22 or the like spontaneously occurs, the accumulator 24 holds the pressure in the clamp pressure chamber 13 constant. In addition, the fluid passage 22 is provided with a pressure gauge 26.

As further shown in FIG. 3A, the M/C 1 is provided with a clamp operating tool 27 for clamping and unclamping of the workpiece 3 by the clamping device 5. The clamp operating tool 27 includes a shank portion 29 that is removably held by the spindle 7, an operating portion 30 that is integrated with the shank portion 29, and a coolant feed passage 31 that penetrates the shank portion 29 and the operating portion 30.

Conventional means may be used to mount and remove the shank portion 29 to/from the spindle 7, and therefore will not be described herein.

A coolant feeder portion 30a having a coolant feed passage 31 formed therein is provided at the center of the operating portion 30. The coolant feeder portion 30a has a first check valve operater 30b that opens the check valve 20 of the clamping-side coupler 18 or the check valve 21 of the unclamping-side coupler 19. The coolant feed passage 31 of the clamp operating tool 27 is connected to a coolant supply passage 7a of the spindle 7.

The operating portion 30 also has a second check valve operater 30c that opens the check valve 20 of the clamping-side coupler 18, and a third check valve operater 30d that opens the check valve 21 of the unclamping-side coupler 19. The second check valve operater 30c, the coolant feeder 30a, and the third check valve operater 30d are arranged in this order and aligned along a lateral line.

The distance between the center of the first check valve operator 30b of the coolant feeder portion 30a and the center of the second check valve operater 30c, the distance between the center of the first check valve operator 30b and the center of the third check valve operator 30d, and the distance between the center of the check valve 20 of the clamping-side coupler 18 and the center of the check valve 21 of the unclamping-side coupler 19 are all equal to one another.

In machining by the M/C 1, a central processing unit (CPU) of the M/C 1 controls the position of the spindle 7, whereby the coolant feeder 30a is selectively inserted into the guide port 18a of the clamping-side coupler 18 or the guide port 19 of the unclamping-side coupler 19.

As shown in FIG. 4A, if the coolant feeder 30a is inserted into the guide port 18a, the first check valve operator 30b abuts the valve body 20a of the check valve 20 of the clamping-side coupler 18, and moves the valve body 20a away from the valve seat 20b to open the check valve 20. At the same time, the third check valve operator 30d is inserted into the guide port 19a, and moves the valve body 21a of the check valve 21 of the unclamping-side coupler 19 away from the valve seat 21b, to open the check valve 21.

Further, if the coolant feeder 30a is inserted into the guide port 19a, the first check valve operator 30b presses against and moves the valve body 21a of the check valve 21 of the unclamping-side coupler 19 away from the valve seat 21b to open the check valve 21. At the same time, the second check valve operator 30c is inserted into the guide port 18a, abuts on the valve body 20a of the check valve 20 of the clamp-side coupler 18, and moves the valve body 20a away from the valve seat 20b to open the check valve 20.

The tool storage unit 8 is provided with an annular tool stocker 8a for holding, for example, the tool holders 6. With the aid of a tool changer (not shown), one of the tool holders 6 is removed from the tool stocker 8a and is fitted to the spindle 7, or removes a tool holder 6 from the spindle 7 and returns it to the tool stocker 8a. The tool storage unit 8 may be conventional and therefore will not be described herein.

Next, the clamping and unclamping operations of the M/C 1 of this embodiment will be described.

If the M/C 1 is in an inoperative state with no workpiece 3 set on the table 4, the clamp operating tool 27 is held in the tool stocker 8a. As shown in FIG. 3A, the check valves 20 and 21 of the couplers 18 and 19 are both closed. In this inoperative state, a coolant is supplied to the unclamping pressure chamber 14 of each of the cylinders 10, 11 and 12. Each of the pistons 10c is at its upper-limit position, namely, abutting a stopper 10d. As shown in FIGS. 3A and 3B, the clamp members 15, 16 and 17 are set in their respective unclamping positions. During machining, coolant is supplied to the area where a machining tool abuts the workpiece 3 and to the machined portion of the workpiece 3. The coolant is a fluid used as a working liquid, as a lubricant, and as a cooling agent. Any conventional coolant can be used as the coolant of this embodiment. In this case, the clamping pressure chamber 13 is at atmospheric pressure (0 Mpa), the gas 25 in the accumulator 24 has expanded to its maximum volume, and the accumulator 24 cannot store any more pressure.

To machine the workpiece 3, the workpiece 3 is set at a predetermined position on the table 4. If an operator then operates a clamp button of the operation panel 9, the CPU moves the spindle 7 to the tool stocker 8a and then actuates the tool changer. The tool changer removes the clamp operating tool 27 from the tool stocker 8a and fits it to the spindle 7 as shown in FIG. 3A. In addition, the CPU moves the spindle 7 in the X-direction and in the Y-direction (perpendicular to the sheet of the drawing), and aligns the center of the coolant feeder 30a of the clamp operating tool 27 with the center of the guide port 18a of the clamping-side coupler 18. Then, the CPU moves the spindle 7 downwards in a Z-direction (vertically in the drawings), inserts the coolant feeder 30a into the guide port 18a of the clamping-side coupler 18 as shown in FIG. 4A, and inserts the third check valve operator 30d into the guide port 19a of the unclamping-side coupler 19. Both the check valves 20 and 21 are thereby opened as described above.

Coolant is supplied to the coolant supply passage 7a of the spindle 7 during machining under control of the CPU. The coolant supplied to the coolant supply passage 7a is injected into the clamping-side coupler 18 via the coolant feed passage 31 of the clamp operating tool 27. Furthermore, the coolant injected into the clamping-side coupler 18 is supplied to the clamping pressure chamber 13 of each of the cylinders 10a through the open check valve 20 and the fluid passage 22. Because the piston 10b is thereby moved downward, each of the clamp members 15, 16 and 17 is moved downward while turning from its clamped position toward its unclamped position. Due to this downward movement of the piston 10b, the coolant supplied to the unclamp pressure chamber 14 is discharged through the unclamping pressure fluid passage 23 and the open check valve 21. Although not shown, the coolant thus discharged is recovered by a coolant recovery portion of the M/C 1, as is the case with the coolant that is supplied in machining the workpiece 3.

For clamping, the clamp members 15, 16 and 17 are moved downward without being turned by the cam grooves 10e.

As shown in FIG. 4A, each of the clamp portions 15a, 16a and 17a of the clamp members 15, 16 and 17 is fitted in a clamp groove 3a (see FIG. 5A) of a workpiece 3 and presses it onto the table 4. When the pressure in the clamping pressure chamber 13 of each of the cylinders 10, 11 and 12 becomes equal to a set pressure $P_0$ Mpa (e.g., 3.5 Mpa or the like), the CPU stops injecting the coolant and moves the spindle 7 upwards.

Then, the valve bodies 20a and 21a of the check valves 20 and 21 move onto their respective valve seats 20b and 21b, and both the check valves 20 and 21 are closed. In addition, the coolant feeder 30a of the clamp operating tool 27 is withdrawn from the guide port 18a, and the third check valve operator 30d is withdrawn from the guide port 19a, with the clamp operating tool 27 assuming the raised position shown in FIG. 6A. A coolant at the set pressure $P_0$ Mpa is sealed in the clamping pressure chamber 13 as shown in FIG. 6A, and each of the clamp members 15, 16 and 17 clamps a corresponding workpiece 3 on the table 4 with a predetermined clamping force as shown in FIGS. 6A and 6B. In this clamped state, the gas 25 in the accumulator 24 has contracted to its minimum volume, and the interior of the accumulator 24 is at the set pressure $P_0$ Mpa.

Then, after moving the spindle 7 to the tool stocker 8a, the CPU actuates the tool changer, removes the clamp operating tool 27 from the spindle 7, returns it to the tool stocker 8a, retrieves a machining tool holder 6 holding a machining tool (not shown) from the tool stocker 8a, and fits it to the spindle 7. Then, as in the case of the M/C of the related art, the workpiece 3 is machined by the machining tool. In the present invention, the machining is carried out while cooling the machining tool and the machined portion of the workpiece 3 by supplying the coolant via the coolant supply passage 7a of the spindle 7, the machining tool holder 6, and coolant supply passages (not shown) of the machining tool, onto the portion of the workpiece being machined.

Even if a slight pressure leak from the clamping pressure fluid passage 22 or the like occurs during machining, the accumulator 24 holds the pressure in the clamp pressure chamber 13 constant, i.e., does not allow it to decrease. Thus, the workpiece 3 is reliably clamped during machining and can be machined with higher precision.

After a series of predetermined machining operations has been completed, the operator operates an unclamp button of the operation panel. Then, the CPU moves the spindle 7 to the tool stocker 8a, actuates the tool changer, removes the machining tool holder 6 from the spindle 7, returns it to the tool stocker 8a, retrieves the clamp operating tool 27 again from the tool stocker 8a, and fits it to the spindle 7. Then, the CPU moves the spindle 7 in the same manner as previously described so as to align the center of the coolant feeder 30a of the clamp operating tool 27 with the center of the guide port 19a of the unclamping-side coupler 19.

Next, the CPU moves the spindle 7 downward, inserts the coolant feeder 30a into the guide port 19a of the unclamping-side coupler 19 as shown in FIG. 5A, and inserts the second check valve operator 30c into the guide port 18a of the clamping-side coupler 18. Both the check valves 20 and 21 are thereby opened as described above.

Next, the CPU injects the coolant into the unclamping-side coupler 19 via the coolant supply passage 7a and the coolant feed passage 31. The coolant injected into the unclamping-side coupler 19 is supplied to the unclamping pressure chamber 14 of each of the cylinders 10a through the open check valve 21 and the unclamping pressure fluid passage 23. Because each of pistons 10b is thereby moved upward, each of the clamp members 15, 16 and 17 is moved upward, withdrawn from the clamp groove 3a of the workpiece 3, and then moved upward while turning from its clamped position toward its unclamped position. Due to the upward movement of these pistons 10b, the coolant that has been supplied to each of the clamping pressure chambers 13 is discharged through the clamp pressure fluid passage 22 and the open check valve 20. The coolant thus discharged is recovered by the coolant recovery portion of the M/C 1 as described above.

Then, each of the clamping members 15, 16 and 17 shifts from its clamped position to its unclamped position as shown in FIGS. 5A and 5B, and the piston 10b abuts the stopper 10d and is thereby stopped from moving upward. Subsequently, the CPU stops the feeding of the coolant and moves the spindle 7 upward.

Then, the valve bodies 20a and 21a of the check valves 20 and 21 move onto their respective valve seats 20b and 21b, and both the check valves 20 and 21 are closed. In addition, the coolant feeder 30a of the clamp operating tool 27 is withdrawn from the guide port 19a, the second check valve operator 30c is withdrawn from the guide port 18a, and the clamp operating tool 27 assumes the raised position shown in FIG. 3A. Thus, the coolant at a predetermined pressure is sealed in the unclamping pressure chamber 14 as shown in FIG. 3A, and the workpiece 3 is unclamped. In this unclamped state, the interior of the clamping pressure chamber 13 of each of the cylinders 10, 11 and 12 is at atmospheric pressure (0 Mpa), the gas 25 in the accumulator 24 has expanded to its maximum volume, and the interior of the accumulator 24 is also at atmospheric pressure.

With the clamping device for the workpiece in the M/C 1 of this embodiment, since the coolant that has been used for cooling the machining apparatus in the related art is used as a power source for producing a clamping force, a dedicated pressure source for clamping can be omitted. This makes it possible to make the entire M/C 1 more compact and to manufacture it at a lower cost.

Moreover, the control for clamping consists of controlling the fitting/removing of the clamp operating tool 27 to/from the tool stocker 8a of the tool storage unit 8 and controlling the supply of the coolant. These controls can be performed by the same control system that controls the machining by the M/C 1 in the related art (i.e., a control for replacing one machining tool with another and a control for supplying the coolant during machining). Therefore, the controls can further be simplified and the cost can further be reduced correspondingly. In this case, the shank portion 29 of the clamp operating tool 27 that is removably engaged with and held by the spindle 7 is structurally identical to the shank of the machining tool holder 6 of the related art, whereby the operation of replacing the clamp operating tool 27 with another one can be performed substantially in the same manner as the operation of replacing one machining tool with another. As a result, the operation of replacing the clamp operating tool 27 with another can be performed quickly, and the clamping and unclamping operations can be performed quickly.

Further, since coolant is supplied every time the clamping operation is performed, a substantially constant clamping force can be obtained, and the workpiece 3 can be stably clamped with the same clamping force over a long period of time, regardless of its thickness. In particular, the clamping device for the workpiece in the M/C 1 of this example is provided with the accumulator 24 functioning as a pressure holding container. Therefore, even if a slight pressure leak from the fluid passage 22 or the like spontaneously occurs during the machining of the workpiece 3, this pressure leak can be absorbed by the accumulator 24 so that the workpiece 3 can still be reliably clamped with a constant clamping force. The workpiece 3 can thereby be machined with higher precision.

Figure 7A:
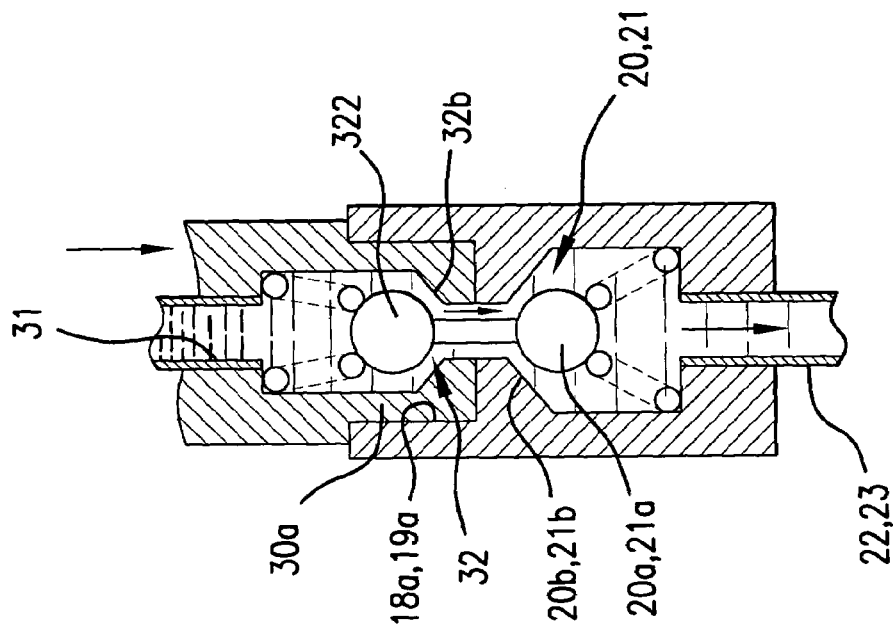
FIG. 7A is a partial schematic view of another embodiment of the invention, where no coolant is injected.
Figure 7B:
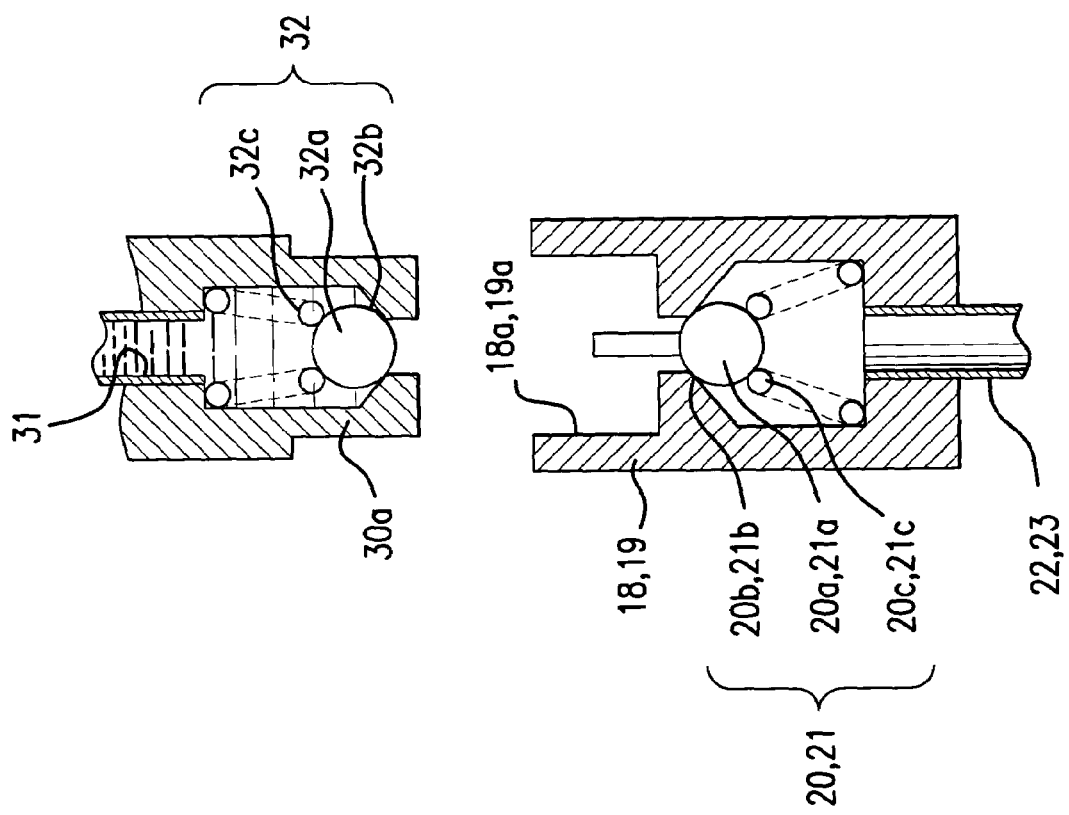
FIG. 7B illustrates the same embodiment where a coolant is injected.

FIG. 7A shows the state where the coolant feeder of the clamp operating tool has not been inserted into the guide port of the holder and FIG. 7B shows the state where the coolant feeder of the clamp operation tool has been inserted into the guide port of the holder. Note that the same components as in the previously described embodiment are denoted by the same reference numerals or symbols and will not be described in detail hereinafter.

As shown in FIGS. 7A and 7B, the M/C 1 of this embodiment is not provided with the first check valve operator 30b, which is provided in the coolant feeder 30a of the clamp operating tool 27 of the previous embodiment. Also, in the M/C 1 of this embodiment, the coolant feeder 30a is provided with a check valve 32. The check valve 32 is composed of a valve body 32a, a valve seat 32b, and a spring 32c. The valve body 32a moves onto and away from the valve seat 32b. The spring 32c biases the valve body 32a toward the valve seat 32b.

In the state shown in FIG. 7A where the coolant feeder 30a of the clamp operating tool 27 has not been inserted into either of the guide ports 18a and 19a of the couplers 18 and 19, the valve body 32a sits on the valve seat 32b, the check valve 32 is closed, and the coolant feed passage 31 of the clamp operating tool 27 is closed. In the state shown in FIG. 7B, where the coolant feeder 30a of the clamp operating tool 27 has been inserted into each of the guide ports 18a and 19a of the couplers 18 and 19, the valve body 32a of the check valve 32 abuts each of the valve bodies 20a and 21a of the check valves 20 and 21, and the valve bodies 32a, 20a and 21a are displaced from their respective valve seats 32b, 20b and 21b, so that the check valves 32, 20 and 21 are all open.

According to the clamp device 5 of the M/C 1 of this embodiment, if the coolant feeder portion 30a has not been inserted into each of the guide ports 18a and 19a of the couplers 18 and 19, the check valve 32 is closed and the coolant feed passage 31 of the clamp operating tool 27 is shut off. Therefore, as soon as the clamp operating tool 27 is fitted to the spindle 7, coolant can be supplied to the coolant feed passage 31 of the clamp operating tool 27. Accordingly, the coolant can be supplied immediately after the check valves 32 and 20 or 21 have been opened through insertion of the coolant feeder portion 30a into the guide port 18a or 19a.

In all the other respects, the M/C 1 of this embodiment has the same structure, operation and effect as the aforementioned embodiment.

In the M/C 1 of each of the aforementioned embodiments the clamp operating tool 27 is provided with the second and third check valve operators 30c and 30d for opening the check valves 20 and 21, respectively, so as to discharge the coolant from the cylinder 10a. However, need for one of the second and third check valve operators 30c and 30d can be eliminated, for example, by rotating the spindle 7 to which the clamp operation tool 27 is fitted by 180° in switching between a clamped state and an unclamped state.

Further, in each of the aforementioned embodiments, the workpiece 3 is clamped and unclamped by vertical rectilinear movement of each of the clamp members 15, 16 and 17 while turning. However, the workpiece 3 can also be clamped and unclamped by either the vertical rectilinear movement or by only turning each of the clamp members 15, 16 and 17.

Furthermore, it is not absolutely required that the check valves 20 and 21, respectively provided in the couplers 18 and 19, be constructed as described in connection with the aforementioned embodiments. Any check valve can be used as long as it is substantially identical in function with the check valves 20 and 21.

The clamping device of the invention is not limited to use with the M/C of the previously described preferred embodiments and can be used with any machining apparatus requiring a clamping device. Further, there is no need to continuously supply a coolant/lubricant area to a workpiece where in contact with the machining tool; rather, the coolant may be supplied only as necessary.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A machining apparatus comprising:
   a spindle;
   means for supplying a coolant to a machined portion of a workpiece in contact with a machining tool fitted to the spindle, via coolant supply passage formed in the spindle, while machining the workpiece; and
   a clamp device comprising at least one fluid pressure cylinder device to which the coolant is supplied, and a clamp member that clamps the workpiece and that is actuated by the fluid pressure cylinder device, responsive to the supply of coolant to the fluid pressure cylinder device; and
   wherein the fluid pressure cylinder device comprises a cylinder, a double-acting piston that divides the interior of the cylinder into a clamping pressure chamber and an unclamping pressure chamber, and a piston rod extending from the piston,
   whereby the clamp member is actuated to clamp the workpiece by supply of coolant to the clamping pressure chamber, and the clamp member is actuated to release the workpiece by supply of coolant to the unclamping pressure chamber.

2. The machining apparatus according to claim 1, further comprising:
   a coolant supply/discharge unit that supplies/discharges the coolant to/from the clamping pressure chamber and the unclamping pressure chamber; and a clamp operating tool which, upon being removably fitted to the spindle, controls the coolant supply/discharge unit, and which has a coolant feed passage which connects to a coolant supply passage of the spindle when the clamp operation tool is fitted to the spindle.

3. The machining apparatus according to claim 2:
wherein the coolant supply/discharge unit comprises:
   a clamping-side coupler connected to the clamping pressure chamber and having a check valve for holding a pressure in the clamping pressure chamber; and
   an unclamping-side coupler connected to the unclamping pressure chamber and having a check valve for holding a pressure in the unclamping pressure chamber; and
wherein the clamp operating tool comprises:
   a coolant feed portion which has the coolant feed passage formed therein, which opens the check valve of one of the clamping-side coupler and the unclamping-side coupler by being inserted thereinto, and which supplies the coolant from the coolant feed passage to one of the clamping pressure chamber and the unclamping pressure chamber by injecting the coolant into one of the clamping-side coupler and the unclamping-side coupler, and
   a check valve operating portion which, upon insertion of the coolant feed portion into one of the clamping-side coupler and the unclamping-side coupler, is inserted into the other thereof, which opens the check valve thereof, and which discharges the coolant supplied to the other of the clamping pressure chamber and the unclamping pressure chamber.

4. The machining apparatus according to claim 3, further comprising:
   a pressure accumulator, for holding a pressure in the clamping pressure chamber constant, in communication with a clamping pressure fluid passage connecting the clamping-side coupler to the clamping pressure chamber.

5. The machining apparatus according to claim 2 wherein a holder for the machining tool and the clamp operating tool have substantially identical shank portions for fitting to the spindle.

6. The machining apparatus according to claim 3 wherein a holder for the machining tool and the clamp operating tool have substantially identical shank portions for fitting to the spindle.

* * * * *